United States Patent
Ioris

(10) Patent No.: US 12,069,990 B2
(45) Date of Patent: Aug. 27, 2024

(54) DEVICE FOR THINNING IN FRUIT GROWING

(71) Applicant: Giorgio Ioris, Ville d'Anaunia (IT)

(72) Inventor: Giorgio Ioris, Ville d'Anaunia (IT)

(*) Notice: Subject to any disclaimer, the term of this patent is extended or adjusted under 35 U.S.C. 154(b) by 787 days.

(21) Appl. No.: 17/258,164

(22) PCT Filed: Jul. 17, 2019

(86) PCT No.: PCT/IB2019/056116
§ 371 (c)(1),
(2) Date: Jan. 6, 2021

(87) PCT Pub. No.: WO2020/016803
PCT Pub. Date: Jan. 23, 2020

(65) Prior Publication Data
US 2021/0195852 A1    Jul. 1, 2021

(30) Foreign Application Priority Data
Jul. 17, 2018  (IT) .................. 102018000007269

(51) Int. Cl.
*A01G 17/02* (2006.01)
*A01G 3/08* (2006.01)
(Continued)

(52) U.S. Cl.
CPC ............. *A01G 17/026* (2013.01); *A01G 3/08* (2013.01); *A01D 46/22* (2013.01); *A01D 46/24* (2013.01);
(Continued)

(58) Field of Classification Search
CPC .......... A01G 17/026; A01G 3/08; A01G 3/00; A01G 3/0408; A01D 46/22; A01D 46/24; A01D 46/26; A01D 46/28; A01D 46/285
See application file for complete search history.

(56) References Cited

U.S. PATENT DOCUMENTS 2,925,687 A * 2/1960 Pronio ................ A01D 46/22
460/61
3,232,034 A * 2/1966 Green ................ A01D 46/253
56/332
(Continued)

FOREIGN PATENT DOCUMENTS

CN       103081730 A  *  5/2013  ............. A01G 3/08
CN       103190299 A  *  7/2013  ............. A01G 3/08
(Continued)

OTHER PUBLICATIONS

Translation of FR 2207640 A, Pub Jul. 26, 1974, Inventor Couderc L. (Year: 1974).*

*Primary Examiner* — Arpad Fabian-Kovacs
(74) *Attorney, Agent, or Firm* — Jose Cherson Weissbrot

(57) ABSTRACT

A device (1) for thinning in fruit growing includes at least one support (3) connected to a tube (2) to which are connected to one or More flexible elements/whips (6), the support (3) connected by at least one plate (10) to an operating machine. The tube (2) is connected to at least one air compressor to supply at least air with variable pressure and/or flow rate to the tube (2), the tube (2) being crossed by the flow of air flowing in the one or more flexible elements (6). The flexible elements/whips (6) are hollow and are able to move when crossed by the flow of air, the movement of the whips modulated by compressed air. The whips (6) have a random oscillatory movement for striking the parts to be thinned with a modulated force depending on the pressure and flow rate of the air flow delivered.

12 Claims, 6 Drawing Sheets

(51) Int. Cl.
*A01D 46/22* (2006.01)
*A01D 46/24* (2006.01)
*A01D 46/26* (2006.01)
*A01D 46/28* (2006.01)
*A01G 3/00* (2006.01)

(52) U.S. Cl.
CPC .............. *A01D 46/26* (2013.01); *A01D 46/28* (2013.01); *A01D 46/285* (2013.01); *A01G 3/00* (2013.01)

(56) References Cited

U.S. PATENT DOCUMENTS

| | | | | |
|---|---|---|---|---|
| 3,237,389 | A * | 3/1966 | Green | A01D 46/264 56/328.1 |
| 3,799,444 | A * | 3/1974 | Read | B23Q 11/0042 239/752 |
| 5,425,225 | A * | 6/1995 | Franco | F16L 39/00 285/302 |
| 8,938,941 | B2 * | 1/2015 | Minelli | A01D 46/264 56/332 |
| 2015/0319930 | A1 * | 11/2015 | Marrs | A01D 46/264 56/329 |

FOREIGN PATENT DOCUMENTS

| | | | | | |
|---|---|---|---|---|---|
| CN | 103533826 | A | * | 1/2014 | ............. A01G 17/00 |
| CN | 104604549 | A | * | 5/2015 | ............... A01G 3/08 |
| CN | 110463441 | B | * | 2/2021 | ............... A01D 45/00 |
| CN | 112492972 | A | * | 3/2021 | ............. A01D 46/22 |
| DE | 19713452 | A1 | | 10/1998 | |
| EP | 1911345 | B1 | * | 2/2012 | ............... A01G 3/08 |
| EP | 2614699 | A1 | * | 7/2013 | ............. A01D 11/00 |
| EP | 2705743 | A1 | | 3/2014 | |
| EP | 3821696 | A1 | * | 5/2021 | ........... A01D 46/264 |
| ES | 1066684 | U | | 1/2008 | |
| FR | 2207640 | A | * | 7/1974 | ............. A01D 46/28 |
| FR | 2514227 | A1 | * | 4/1983 | ............. A01D 46/28 |
| FR | 2965702 | A1 | | 4/2012 | |
| WO | WO-2012170011 | A1 | * | 12/2012 | ........... A01G 17/005 |
| WO | WO-2019049130 | A1 | * | 3/2019 | ........... A01D 46/084 |

* cited by examiner

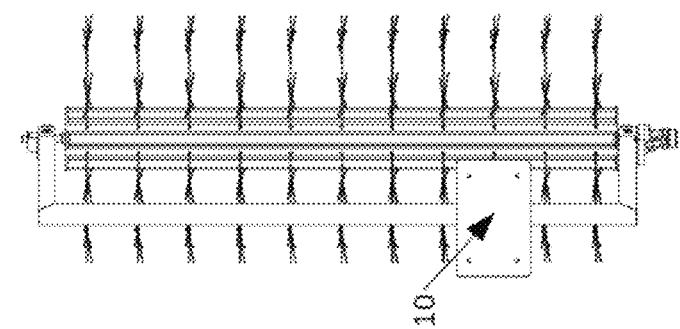
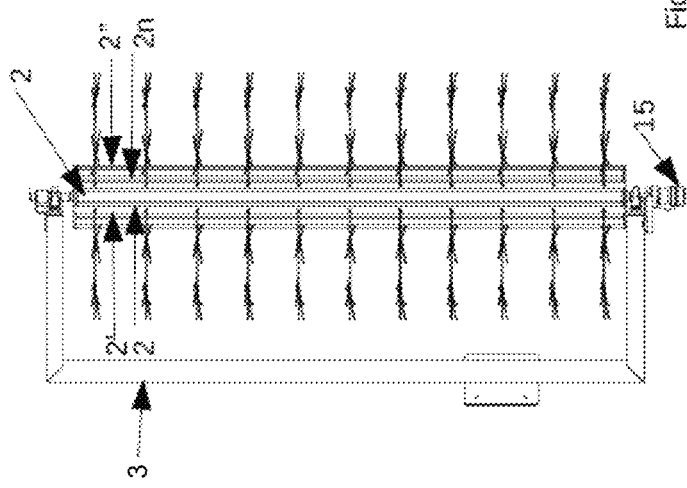
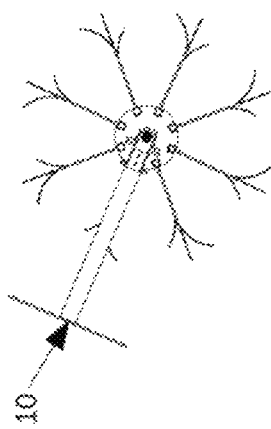
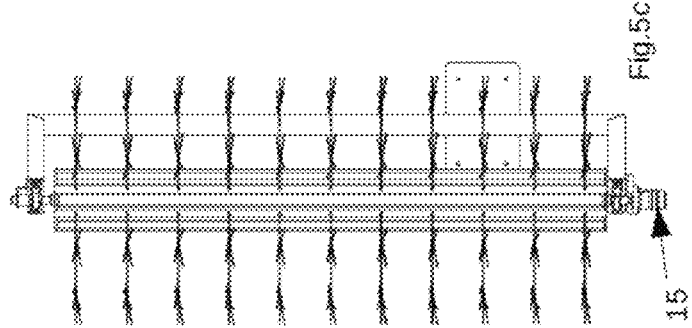
Fig. 5

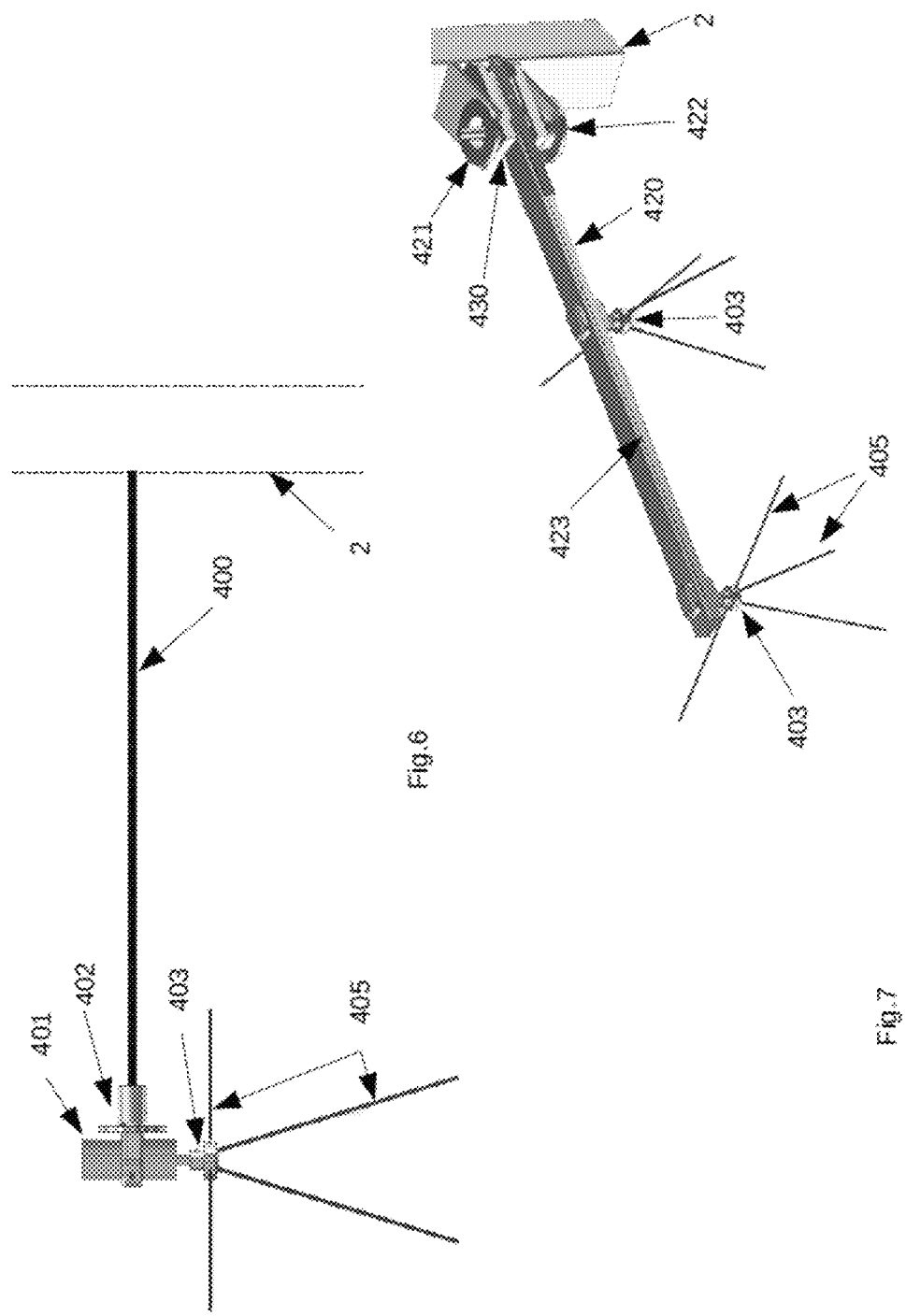

DEVICE FOR THINNING IN FRUIT GROWING

SCOPE OF THE INVENTION

The present invention is relevant to the agricultural field and more specifically in the field of fruit growing.

In recent years, the agricultural sector has undergone significant developments, often due to the need to meet the demands of the production of products that can meet certain standards, including, for example, in fruit growing, the size of the fruit produced, which is often recognized as a quality parameter, as well as the quantity and availability of the fruit itself, which should remain as constant as possible over the years.

In order to satisfy these needs, the main intervention to be used on plants, in particular as said on fruit plants, is to manage and control adequately the number of fruits per plant so that the fruits brought to maturity on each fruit tree can fall within a certain optimal range, resulting in a size of the fruit of a certain dimension and a quantity produced rather constant from year to year for each plant.

It is therefore necessary to intervene on plants, as is known to experts in the field, in particular for the early elimination of fruits exceeding the standard said, this in a timely and rapid fashion since the period in which this can be done has a very precise and limited duration.

STATE OF THE ART

In order to obtain this result, namely the early elimination of the surplus fruits, various systems and methods are known in the art, including methods that involve the use of chemically active ingredients that work by selecting the small fruits and dropping the weakest ones: however, in addition, a manual intervention is needed to further correct the productive load therefore a double intervention is necessary. In addition, as is well known, chemicals are increasingly being challenged for environmental reasons, being subject to significant restrictions on use and often not exceeding the renewals of registration permits to which they are subject.

Furthermore, crops that do not use any chemical product and whose production is particularly coveted by those who want so-called organic products, products for which consumers are willing to spend a lot, are increasingly of economic interest in the sector, and this is therefore very important for the producer.

Mechanical devices are also known which allow the thinning out of a part of the flowers near the flowering, this, while on the one hand has the advantage of unloading the plant of a part of the flowers very early, so avoiding in the beginning the production of excess fruits, on the other hand presents several problems as illustrated below. The device in question includes a support that supports a central rotating tube on which hundreds of plastic wires are fixed over the entire length and circumference, a hydraulic motor is connected to this shaft, the support in turn is connected to an agricultural machine, such as a tractor from which it is fed.

When the device starts working, the tube connected to the hydraulic motor starts to turn at a speed of 200/300 rpm. The centrifugal force arranges the wires perpendicularly to the connecting surface with the rotating tube which, during the work phase, has a rotation axis arranged vertically with respect to the ground; the device which is connected by means of a special flange to said tractor, can start working by proceeding at a fairly sustained speed along the cultivation row. The result is a thinning of the flowers through a mechanical action of thinning due to the percussion on the flowers of the wires connected to the rotating tube.

The device in object has been present for many years but in reality so far is not used in a generalized manner as it has many drawbacks: The main drawback is that the plant suffers significant damage to the vegetation (twigs, leaves) especially in the outer parts as they are most exposed to contact with the striking wires (or whips); In addition, the internal parts of the plant, especially in orchards that have a more developed production wall, are excluded from the action of the wires, this is because of the constructive nature of the machine, the action of the rotating wires acts disadvantageously only on the outside of the plant and consequently the whip does not penetrate into the shaded and internal part of the same that remains more protected and more in need of thinning.

This machine still, in a disadvantageous way, does not allow adjustments of the working parameters, except the adjustment of the rotation speed of the rotating central tube, which, however, to be effective must remain high and consequently the forward speed of the tractor can not go below certain levels as they would further increase the damage to vegetation, this because by going too slowly the device would work too much on the same plant causing more damage than benefits. Furthermore, this device is not suitable for other processes due to the aggressiveness of the action on the plant and the impossibility of adjusting the parameters.

Therefore, the speed at which the cultivation rows must be driven through with the device connected to the tractor must always remain high, causing problems in manoeuvring, especially at the end and at the beginning of the row and requiring great care even during the working phase.

Furthermore, this device can only be used for floral thinning, so in the event that during flowering such an operation could not be carried out it would be necessary to act with means such as chemicals and manual action, with the disadvantages mentioned above in addition to really high operating costs.

One purpose of this invention is to solve the known art problems described above.

It is a purpose of this invention to describe a thinning device that is suitable for flowers, buds, blossoms and fruits.

A further purpose of this invention is to describe a thinning device that can thin the fruits even in the inner part of the plant.

Another purpose of this invention is to describe a thinning device that maintains the integrity of the plant.

A further purpose of this invention is to describe a thinning device that can be adapted to different crops.

A further purpose of this invention is to describe a thinning device that is efficient both on the inside and outside of the plant.

Another purpose of this invention is to describe a flower thinning device that is easy to use for an expert in the field.

Another purpose of the present invention is to describe a thinning device that allows to contain the processing costs.

A further purpose of this invention is to describe a device suitable for every type of cultivation, both organic and non-organic.

BRIEF DESCRIPTION OF THE INVENTION

These and other purposes will be achieved by the innovative thinning device comprising at least one support to which is connected a tube to which are connected one or more flexible elements/whips and said support is connected by means, such as at least one plate to an operating machine such as a tractor, characterized by the fact that said tube is connected to at least one air compressor to supply at least air with variable pressure and/or flow rate to said tube, said tube being crossed by said flow of air flowing in said one or more flexible elements (6), said flexible elements/whips (6) being hollow and able to move when crossed by said flow of air, the movement of the whips being modulated by compressed air, the whips (6) having random oscillatory movement by striking the parts to be thinned such as flowers and/or small fruits with modulated force depending on the pressure and/or flow rate of the air flow delivered.

Note that since the whips are crossed by a flow of air, the action of percussion on the elements to be thinned in each variant is much less bloody than the action exerted by the whips that act by centrifugal force. Still, in an even more advantageous way, the power (pressure and/or flow rate) of the air flow delivered being modulable in a very precise way to obtain exactly the desired force of action for thinning, this allows the use of this device in a plurality of types of crops.

To obtain this modulation, at least one pressure and/or air flow regulator, usually present on the compressor, is considered. Alternatively, it is possible to connect a dedicated pressure regulator, placed for example on board the agricultural vehicle and connected to the compressed air circuit connected to the device's tube.

Furthermore, in one or more variants the hose can remain fixed or rotate, this to allow greater penetration of the flexible elements into the plant when the rotation occurs slowly in relation to the speed of advancement of the tractor (e.g. effect of gearwheel on rack) so that in this case the rotation movement of the hose does not serve to give force to the flexible elements but to allow the insertion of it in the innermost part of the plant.

Furthermore, these hollow flexible elements are composed of one or more sections characterized by different material thicknesses and internal cavities of different shapes and sections to modulate the oscillation of the element according to the needs as will be better described below.

Still, said one or more tubes, which can be of any section, are connected in one or more points on the surface of the tube one or more hollow flexible elements.

Finally, a further variant of the present invention is represented by the possibility of moving the flexible elements instead of by compressed air as a whole, with electric and/or hydraulic and/or pneumatic motors, for example by means of adjustable electric mini-motors applied on an elastic support that will be connected directly to the distal part of the tube.

Or the movement can be transmitted by one or more electric and/or hydraulic motor(s) connected directly to this support that transmits the motion mechanically to suitable means (such as a belt connected in turn to pulleys connected to spindles) that are connected directly to the flexible elements, the flexible elements therefore being hollow or not hollow.

The flexible elements can be of various geometry and material depending on the work to be carried out, for example they can consist of a single stem or a bifurcated stem, trifurcated, quadrifurcated etc. then have one or more appendices branching from the central stem and/or with different sections the function of these beneficial variants will be described with reference to the figures.

In particular, in a further advantageous way, one or more of these flexible elements/whips and/or appendices can have any length even different from each other.

This device can be connected to an operating machine by means of mechanical and/or hydraulic and/or pneumatic interfaces.

In a preferred form of construction, the innovative floral thinning device consists of a central tube that will be connected by means of a support and, for example, a flange to the means of attachment of an operating machine (mechanical, hydraulic and pneumatic means). One or more hollow flexible elements are connected to said tube, which can rotate or remain stationary during the work phase, at several points on the lateral cylindrical surface. The compressed air is made to flow from an external compressor towards the central tube and therefore inside said hollow flexible elements: if a more superficial thinning is to be carried out, the central tube will remain stationary while the operating machine will advance along the cultivation row; in this way the hollow flexible elements, crossed by the compressed air, will oscillate chaotically presenting a more accentuated flexion at the end not connected to the tube. These whips will gently strike the plants allowing the desired thinning (of flowers and/or small fruits).

If, on the other hand, a more complete thinning is to be carried out, working in an advantageous and innovative way both on the outside and also on the inside of the plant, the central tube to which the hollow flexible elements are connected will rotate while the operating machine will move along the row, thus allowing the flexible elements to wedge easily even in the innermost part of the plant and therefore to thin out not only superficially thanks to the extremities which this time will oscillate and hit the innermost part of the vegetation. Note that the movement transmitted by the compressed air to the hollow flexible elements, will give these hollow elements a random oscillatory movement, more pronounced and faster at the farthest end of the tube and a slower and less extensive oscillatory movement near the connection with the tube this still to the advantage of optimal processing especially in the case of having to work the plant with greater vigor in the inner part, which is usually thicker and more intricate.

It should also be noted that the floral thinning device which is the subject of this invention may have different types of adjustments: the first is determined by the speed of advancement of the operating machine which will intensify the thinning with a slower advancement and on the contrary will decrease the thinning with a higher speed. It is possible to intervene very advantageously by regulating either the flow or the pressure of the compressed air, consequently determining a considerable variation in the peripheral speed and in the frequency of the movement of the whip.

It will still be possible to intervene by rotating the vertical tube where the pneumatic whips are fixed and fed by compressed air, in a slow and proportional way with respect to the advancement of the tractor. This movement will allow the whip to penetrate into the inner part of the plant if the volume of the same is large, as well as allowing simultaneously to act on the outside while, increasing the speed of rotation of said tube, the intensity of thinning can also be increased proportionally.

Still, in an even more advantageous way, in one or more embodiment forms it is included a set of central tubes, with power supply also differentiated between them, from time to time can be fed with blown air one, some or all the tubes of the set to power only the tubes in the proximity of the plants and optimize energy consumption.

Finally, in an even more advantageous way, the versatility of the device for floral thinning can be further extended by mounting flexible elements or "modular" whips: that is to say that as the shape or volume of the plant or the production wall varies, whips of different lengths or with two or three or more branches can be foreseen and mounted, this once again to obtain different effects on the thinning capacity.

As mentioned above, in order to adapt to the various forms of cultivation and to the various heights of the plants, the machine should preferably be connected to the tractor at the front with a system equipped with hydraulic movements that allow the hose to which the whips are connected to respond effectively to the various situations that arise. The machine will be completed with a suitable compressor that will be mounted with a special structure on the rear lifting arms and driven by the tractors power take-off.

BRIEF DESCRIPTION OF THE FIGURES

These and other advantages obtained by virtue of the innovative thinning device described by the present invention will be better exposed with reference to the description of some particularly preferred forms of realization of the present invention, which have representative and not limiting purposes of the same:

in FIG. 5—subdivided in FIG. 5a rear view, 5b side view, 5c front view, 5d plan view—it is represented a fifth example of a preferred form of realization of said device for the floral thinning 1;

in FIG. 6—it is represented a further example of a preferred form of realization;

and in FIG. 7—another example of a preferred form of realization is represented.

DETAILED DESCRIPTION OF THE FIGURES

Figure 1:
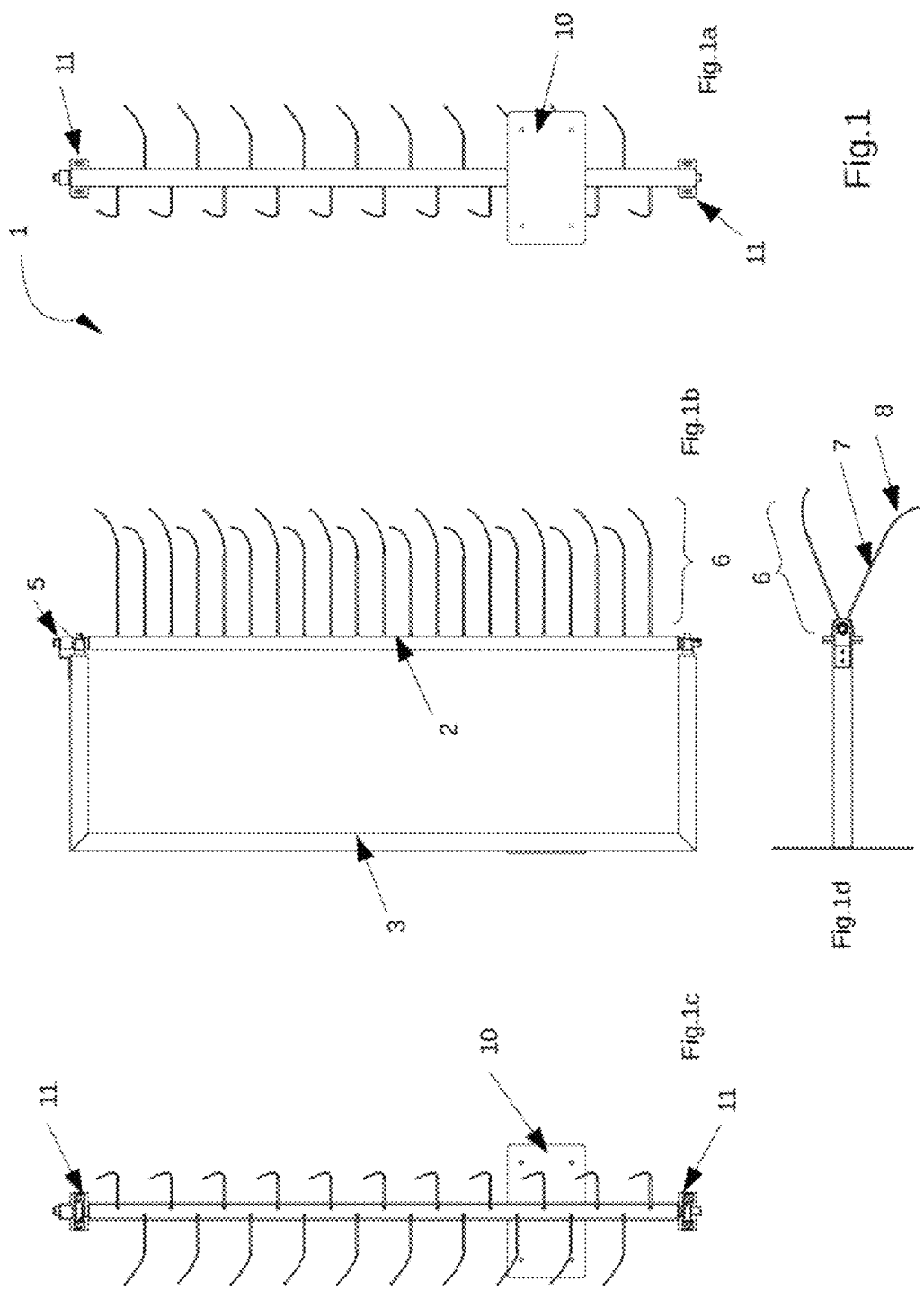
in FIG. 1—subdivided in FIG. 1a rear view, 1b side view, 1c front view, 1d plan view—it is represented a first example of a preferred form of realization of said device for floral thinning.

In FIG. 1 it is represented—here and below for all FIGS. 1a, b, c, d reference will be made to the general FIG. 1—a first example of a particularly preferred form of realization of said device for thinning in fruit growing, in particular suitable for floral thinning 1 (and/or of small fruits in some forms of realization) comprising at least a support 3 that supports at least a tube 2 of any section by means of connections 11; at least one compressed air supply medium is further included in said at least one tube, so that said tube is crossed by compressed air by means of a connection 5 e.g. to an external compressor (not shown here). This device includes at least a flange 10 for mechanically connecting this device to an operating machine (e.g. a tractor not shown here); in said device 1 the tube 2 in this form of construction remains fixed with respect to the support 3. To said tube 2 are connected preferably on the part opposite the flange 10 one or more flexible elements 6 that are also hollow and therefore able to make the compressed air coming from tube 1 flow inside them. These flexible elements 6 can be realized in one or more sections of different diameter,—and in more different forms, provided they are hollow—in this specific case is represented (FIG. 1d) a larger section, that is a larger diameter 7 and a minor diameter section 8, that is smaller.

During the processing or during the thinning of a cultivation row, the device for thinning floral 1 is moved facing the elements 6 towards the plants to be thinned, the compressed air from tube 2 flowing towards the elements 6 will set them in motion causing a stronger oscillation at the ends and a lesser oscillation near the point of connection with tube 2, this oscillation thanks to the contact of elements 6 with the plant will produce a slight shaking of the leaves which in turn will determine the thinning of flowers and/or small fruits. Advantageously, the shaking will be much more delicate and respectful of current culture than what was achieved with prior art means.

Figure 2:
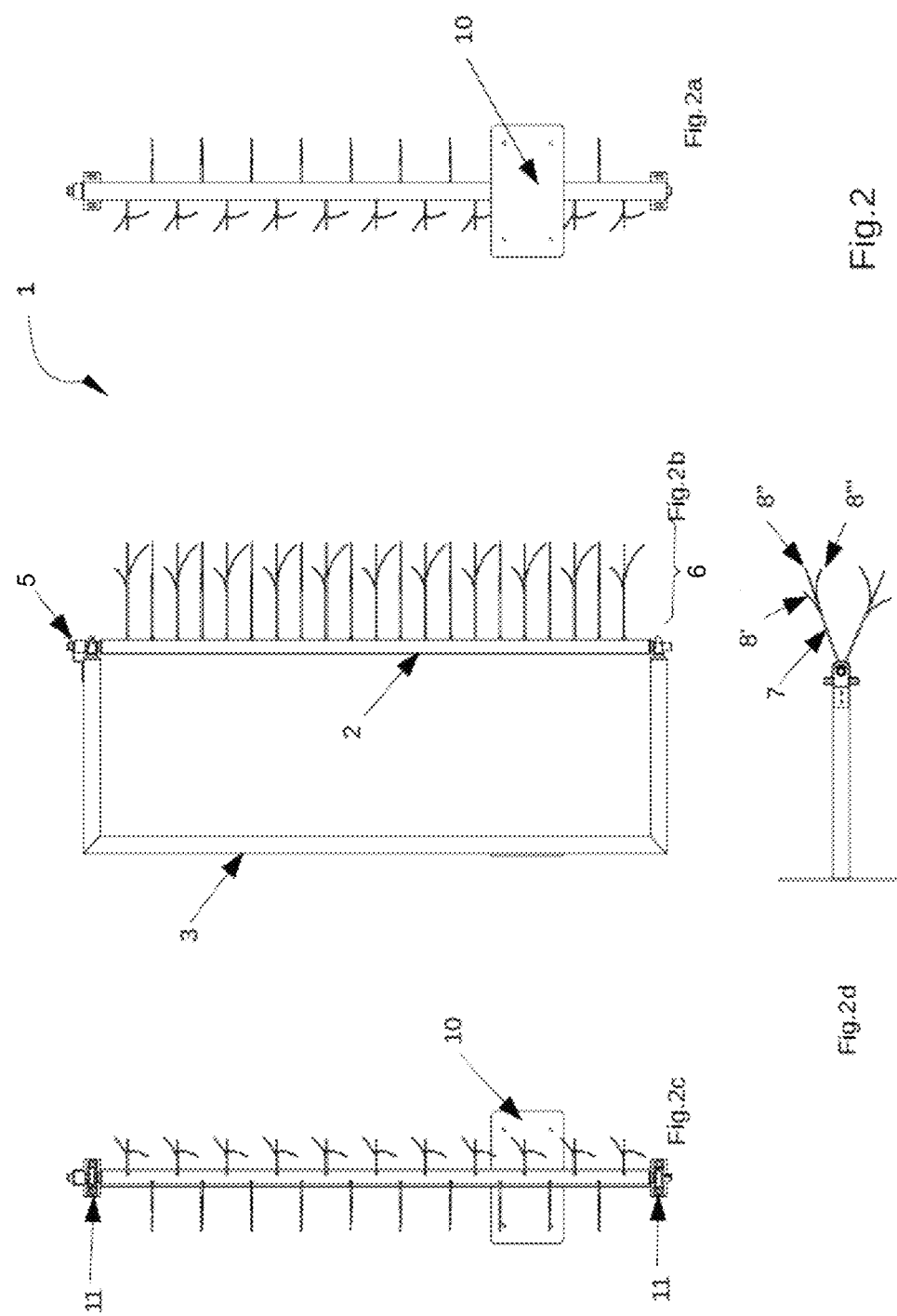
in FIG. 2—subdivided into FIG. 2a rear view, 2b side view, 2c front view, 2d plan view—it is represented a second example of a preferred form of realization of said device for floral thinning.

In FIG. 2 it is represented a variant in the flexible elements 6—with reference to the FIG. 2 it is intended also here for simplicity all the FIGS. 2a, b, c, d—in fact in this embodiment example there are a plurality of appendices 8", 8", 8" relative to the same flexible element 6. For example, the appendices can be branched from a point 7 of greater/larger section.

This variant allows to intensify the work of the flexible elements 6 and to make it more precise and effective by virtue of a larger area beaten by the appendages, this also allows a further possible adjustment of the thinning capacity of the device 1 object of this invention.

Figure 3:
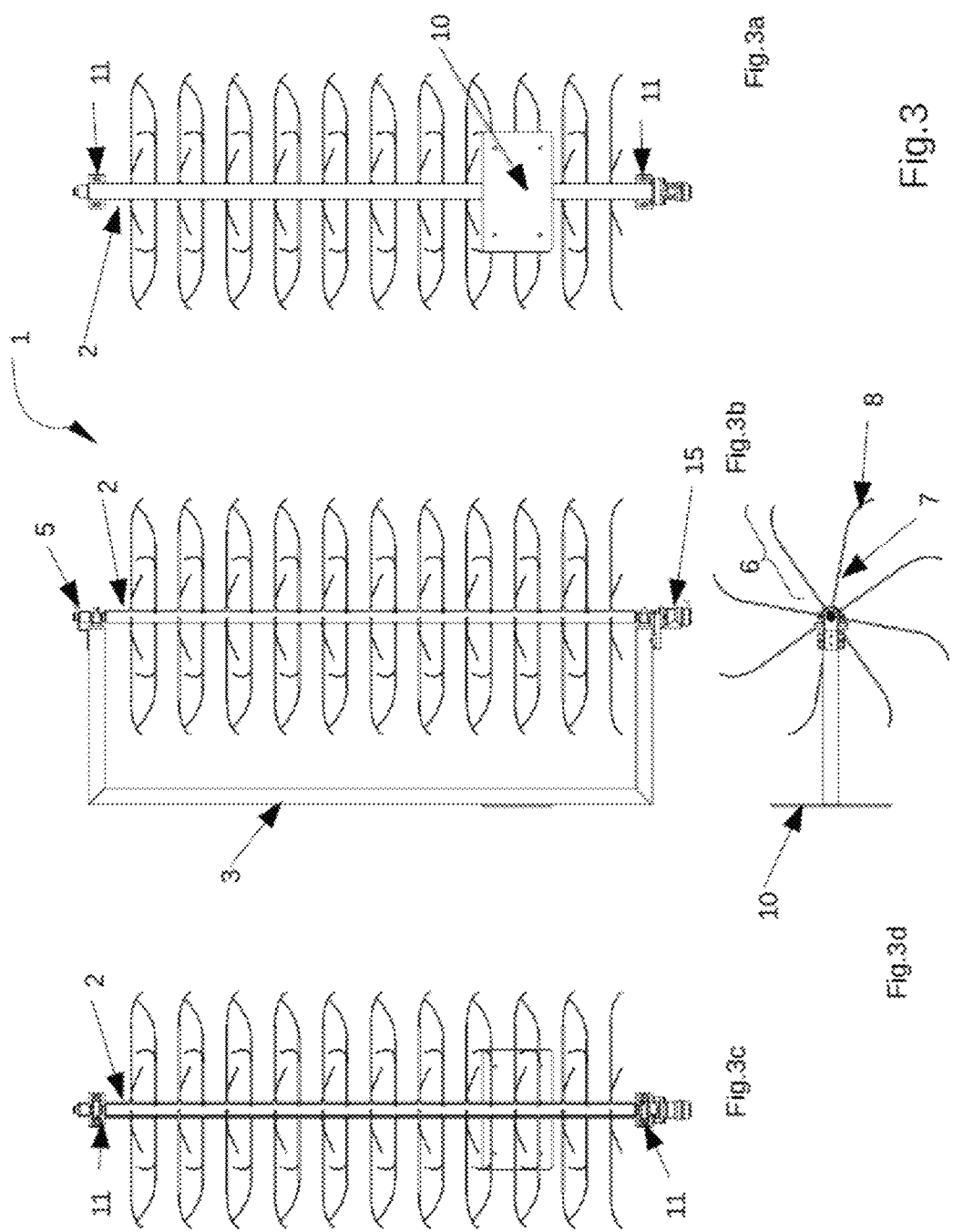
in FIG. 3—subdivided in FIG. 3a rear view, 3b side view, 3c front view, 3d plan view—it is represented a third example of a preferred form of realization of said device for the floral thinning 1.

In FIG. 3—with reference to FIG. 3, all FIGS. 3a, b, c, d are intended here for simplicity—in this example the device for floral thinning 1 includes at least a rotating tube 2 virtue of a motor for example a hydraulic motor 15; in this case the flexible elements 6 are arranged on the whole surface of the tube 2. During the advancement of the tractor along the row, the flexible elements 6 are not simply dragged on the branches but are more directly inserted between the vegetation. Namely, in addition to making compressed air flow in the flexible elements 6 as already described above, the tube 2 is rotated with a speed suitable to allow the insertion of flexible elements 6 between the branches of the plants (simulating an effect similar to a toothed wheel on a rack) so as to allow a deeper processing of the plant and succeeding in thinning the flowers and/or small fruits even in the parts less accessible this is due to the greater penetration of the appendices 8 of smaller diameter into the vegetation, all to the advantage of a more precise and complete processing. Note that the flexible elements 6 may include at least one appendix 8 or more of one as described above. (The number of appendices being variable at will, as well as the number of flexible elements and in any variant of construction also more than 2 tubes can be conceived, made as the one described above.)

Figure 4:
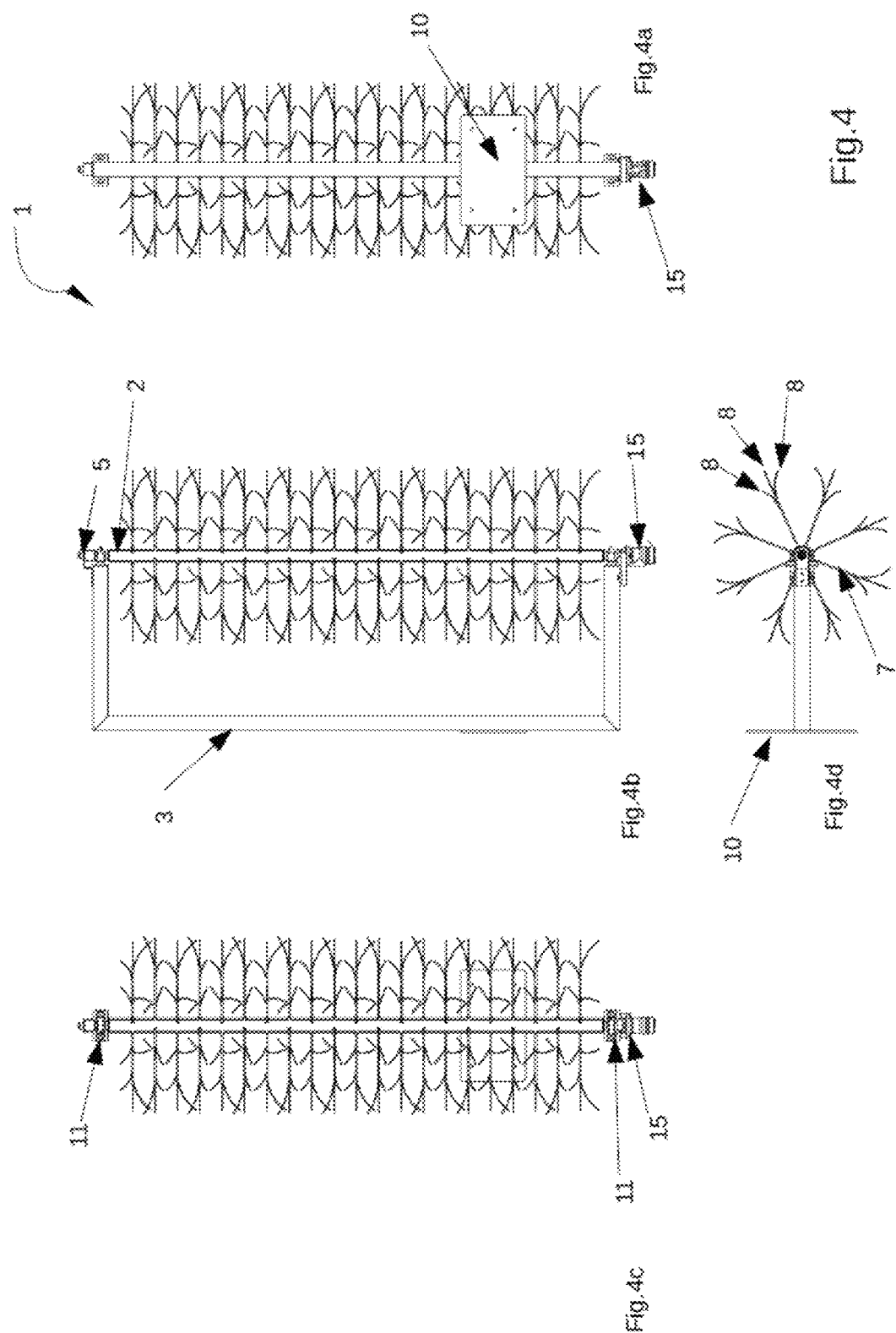
in FIG. 4—divided into FIG. 4a rear view, 4b side view, 4c front view, 4d plan view—it is represented a fourth example of a preferred form of realization of said device for floral thinning 1.

In FIG. 4—with reference to FIG. 4 it is intended also here for simplicity all FIGS. 4a, b, c, d it is represented a variant with respect to the representation of FIG. 3 in particular the flexible elements 6 having more than one appendix 8 are highlighted.

In FIG. 5—with reference to FIG. 5, all FIGS. 5a, b, c, d are also intended here for simplicity. Instead, a form of realization is represented in which the presence of more than one central tube 2 is highlighted, that is, a set of tubes is included: tubes 2", 2", 2", 2n, having the main function of managing more economically the compressed air directed to the flexible elements 6. The possibility of having a set of tubes allows to feed from time to time only the flexible elements actually being processed on and within the plant/ row. Basically, only the 2n tube and its respective connected flexible elements facing the row are supplied with compressed air, while the power supply is closed to those furthest from the plant and therefore not operational. This solution therefore saves on the power of the compressor that will have to supply the compressed air to device 1.

FIG. 6 shows an embodiment variant where, there are props or supports of elastic or semi-rigid material 400 connected to said tube 2, they are able to support at least a mini-engine 401 mounted on a swivel support 402. The rotor axis of the mini-engine(s) will be equipped with a spindle 403 to which 6 flexible elements are attached, which are defined here for convenience elastic whips 405, which in this case may or may not be hollow.

This variant allows a slow rotation of the tube 2 and therefore the consequent advantages already described above. The rotation speed of the electric motors can be adjusted individually or in groups with special potentiometers. The rotary movement of the whips 405, if deemed appropriate, can be modified into an alternative or even random translatory movement, with special guides attached to the stator of the motor.

In FIG. 7 is represented an embodiment variant in which the rotary movement is generated centrally by one or more electric and/or hydraulic motor/s connected directly to said tube 2, said motor transmits the motion mechanically to suitable means (such as for example a belt 423 connected in turn to pulleys connected to spindles 403) that are connected directly to the flexible elements 405.

The motion is transmitted through a longitudinal axis along the whole central tube 2, which will be equipped with supports 421 attached to said tube; to said supports 421 are hinged arms 420 by means of a mobile hook 430, this allows an oscillatory movement of the arms 420 on a plane perpendicular to the axis of rotation of tube 2. Support 421 will be equipped with a spring or elastic system 422 that will return the hook or moving part 430 of support 421 always in the central position. The arm 420 shall include inside means such as one or more pulleys (not visible here) and a belt 423 that transfers the movement to one or more spindles 403 connected to said arms 420, to said spindle(s) will be fixed the whips 405 in various possible inclinations. Also in this case, depending on the functioning of the motor (direction of rotation, speed, etc.) the whips may have different movements, but the system in this case will not be able to rotate and therefore will be more suitable for narrower forms of breeding.

The whips that will be fixed to the rotating spindle, will have shapes, sizes and characteristics so that their movement is as selective as possible and will hit the flowers in greater proportions than the leaves, or will be designed with materials, type of section and diameter of the same or different size suitable for the purpose.

In order to carry out a selective processing, in the case of rotary movement, the whips, if properly shaped, can generate a downward flow of air (e.g.: as in the case of the propellers of drones) so that the leaves with a larger surface are lowered more than the flowers and consequently have a lower chance of being affected by the whip.

In the case of different movements, the outer edge at the end of the whip, namely the one that impacts on the vegetation, should have alternately concave areas with a sharp surface and areas with convex and rounded surface. In this way the part of the whip that impacts with the vegetation will preferably cut the stems of the flowers and will tend instead to avoid the leaves.

It is understood that both possibilities, as well as the variants previously described, all have in common the aim of originating a whip motion that starts at the entire volume of the plant and then allows for a homogeneous processing of the same volume especially in the central part of the same, an objective that can not be pursued with a rotary movement that originates from the central tube and therefore external, as in this case the whips would preferably impact on the external surface of the branches of the plants.

It is to be noted that in each variant, depending on the opportunity, the motor(s) may be electric, hydraulic and/or pneumatic.

It is therefore clear that this innovative thinning device offers all the technical advantages described above in a very advantageous way.

Variants in materials in which the device is made, type of compressor, supply, assembly on agricultural machinery or other type of operating machine, number of tubes, mode of air supply, shape of appendices 6, number of appendices, the various diameters, energy supply, type of compressors, adjustment of movement modes, etc. are to be considered mere variants of the construction of the present invention that do not go in any case to restrict the scope of protection of the present invention, as better explained in the attached claims.

What is claimed is:

1. A device (1) for thinning in fruit growing comprising at least one support (3) connected to a tube (2), said tube (2) connected to one or more flexible elements/whips (6), said support (3) connected by at least one plate (10) to an operating machine, wherein
    said tube (2) is connected to at least one air compressor to supply at least air with variable pressure and flow rate to said tube (2),
    said tube (2) being crossed by flow of air flowing in said one or more flexible elements/whips (6),
    said one or more flexible elements/whips (6) being hollow and able to move when crossed by said flow of air, the movement of the one or more flexible elements/whips (6) being modulated by compressed air,
    the one or more flexible elements/whips (6) having random oscillatory movement by striking the parts to be thinned with modulated force depending on the pressure and flow rate of the air flow delivered,
    wherein said device comprises an electrically steerable mini-motors (401) applied on an elastic support (400), the electrically steerable mini-motors (401) are connected directly to the distal part of the tube (2), an axis of a rotor of said electrically steerable mini-motors (401) are equipped with a mandrel (403) and said one or more flexible elements/whips (6) are fixed to the mandrel (403), also elastic whips (405) which are either hollow or solid.

2. The device (1) for thinning in fruit growing according to claim 1, wherein the tube (2) remains fixed, for a more superficial thinning, or rotates to allow greater penetration of the one or more flexible elements/whips (6) into a plant.

3. The device (1) for thinning in fruit growing as claimed in claim 2, wherein
    said one or more flexible elements/whips (6) comprise one or more sections, at least one wider section (7) of the one or more sections, and at least one narrower section (8) of the one or more sections,
    the one or more flexible elements/whips are made of same or different materials, and thicknesses and internal cavities of the same or different shape and section, to modulate the oscillation of the element according to requirements.

4. The device (1) for thinning in fruit growing as claimed in 2, wherein said tube (2) comprises one or more sections.

5. The device (1) for thinning in fruit growing as claimed in claim 4, wherein a surface of said tube (2) is connected in one or a plurality of points to one or more flexible elements/whips (6).

6. The device (1) for thinning in fruit growing as claimed in claim 5, wherein said one or more flexible elements/whips (6) comprise a single stem (7) with a constant section or a single stem with a variable section (7,8) or one or more bifurcated (8',8"), trifurcated (8',8",8'"), quadrifurcated (8', 8",8'",8"")
said one or more flexible elemmts/whips (6) comprise one or more appendices (8) branching off from the single stem (7).

7. The device (1) for thinning in fruit growing as claimed in claim 6, wherein said one or more flexible elements/whips (6) and appendices (7,8,8',8", etc.) have variable length.

8. The device (1) for thinning in fruit growing as claimed in claim 1, comprises a set of central tubes (**2",2'"*,2"',2** *n*), with variable power supply.

9. The device (1) for thinning in fruit growing as claimed in claim 1, wherein said one or more flexible elements/whips (6) have a random oscillatory movement, more pronounced and faster at the farthest end of the tube and a slower and less wide oscillatory movement near the connection with the tube to the advantage of a vigorous processing in the inner part of the plant, more dense and intricate.

10. The device (1) for thinning in fruit growing as claimed in claim 1, in which said tube (2) is rotating by effect of a motor.

11. The device (1) for thinning in fruit growing as claimed in claim 10, where said device is powered by electric and hydraulic and/or pneumatic motors.

12. The device (1) for thinning in fruit growing as claimed in claim 11, in which one or more electric and hydraulic motor is directly connected to said tube (2) equipped with supports (421) attached to said tube, to said supports (421) are hinged arms (420) by means of a mobile hook (430), this allowing an oscillatory movement of the arms (420) on a plane perpendicular to the axis of rotation of the tube (2), the supports (421) being equipped with a spring or elastic system (422) able to bring the hook or mobile part (430) of the support (421) always in the central position, the arm (420) including within it means (423) to transfer the movement to one or more spindles (403) connected to said arms (420), to said one or more spindles (403) being fixed the elastic whips (405) in various possible inclinations.

\* \* \* \* \*